(12) United States Patent
Clamen et al.

(10) Patent No.: US 7,150,787 B2
(45) Date of Patent: Dec. 19, 2006

(54) POLYMER-MODIFIED GYPSUM COMPOSITION

(75) Inventors: Guy Joseph Clamen, Opio (FR); Bruno Pollet, Valbonne (FR)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/665,281

(22) Filed: Sep. 18, 2003

(65) Prior Publication Data
US 2004/0055511 A1   Mar. 25, 2004

(30) Foreign Application Priority Data
Sep. 20, 2002  (FR) ................. 02 292326

(51) Int. Cl.
*C04B 11/00* (2006.01)
*C04B 24/24* (2006.01)
*C09K 8/00* (2006.01)

(52) U.S. Cl. .............. 106/778; 106/772; 106/775; 106/790; 523/130; 524/2; 524/3; 524/4; 524/5; 524/6; 524/7; 524/8

(58) Field of Classification Search ............... 106/772, 106/775, 776, 778, 790; 523/130; 524/2, 524/3, 4, 5, 6, 7, 8
See application file for complete search history.

(56) References Cited

U.S. PATENT DOCUMENTS

| | | |
|---|---|---|
| 3,388,022 A | 6/1968 | Bloom et al. |
| 3,947,398 A | 3/1976 | Williams |
| 4,157,264 A | 6/1979 | Kennedy-Skipton |
| 4,661,161 A | 4/1987 | Jakacki et al. |
| 4,804,688 A | 2/1989 | Vassileff |
| 5,746,822 A | 5/1998 | Espinoza et al. |
| 5,779,786 A | 7/1998 | Patel |
| 6,228,163 B1 | 5/2001 | Espinoza et al. |

FOREIGN PATENT DOCUMENTS

| | | |
|---|---|---|
| EP | 0562651 A | 9/1993 |
| EP | 1054046 | 11/2000 |
| GB | 1432157 A | 4/1976 |
| WO | WO99/48833 | 9/1999 |

OTHER PUBLICATIONS

Singh et al.; "Retarding Action Of Various Chemicals On Setting And Hardening Characteristics Of Gypsum Plaster At Different pH", *Cement and Concrete Research*, vol. 27, No. 6, pp. 947-950; (1997), no month.

Boisvert et al.; "Hydration of calcium sulfate hemihydrate ($CaSO_4$ ½ $H_2O$) into gypsum ($CaSO_4$-$H_2O$). The influence of the sodium poly(acrylate)/surface interaction and molecular weight"; vol. 220 pp. 579-591; (2000), no month.

*Primary Examiner*—Elizabeth D. Wood
(74) *Attorney, Agent, or Firm*—Kim R. Jessum; Ronald Bakule

(57) ABSTRACT

A composition including two components is provided. When the two components are admixed in the method of the invention a polymer-modified gypsum composition is provided. The admixture exhibits a useful balance of setting time and stability.

8 Claims, No Drawings

POLYMER-MODIFIED GYPSUM COMPOSITION

This invention relates to a two component composition including gypsum and two addition polymers. More particularly, the invention relates to a composition including Component A and Component B; Component A includes: gypsum, an alkaline first polymer, an alkaline agent, and a hydration inhibitor; and Component B includes: an second polymer, a filler, and an activator. When the components are combined, the admixture, optionally including fibers, is useful in the manufacture of structures and composite construction components including structural and decorative architectural materials such as laminated panels for use in cladding and solid surfaces such as counter-tops; for drill bore applications, patching and repair, grouting for anchoring bolts and the like, statues, open and closed cell foam, model making, and rigid tooling; and as a rapid setting coating for sandwich panels, molding, duct-work, piping and cladding systems, and traffic paint applications. It is of particular value as a semi-impervious reinforcing coating on the internal surfaces of subterranean mines.

Particular problems exist in underground mining operations for coal, gold, platinum and the like in which it is necessary to provide support to the wall and ceiling surfaces of the mine shafts as soon after excavation as possible. This is because the recently excavated rock facing can be susceptible to cracking and spalling. If exposed for too long a period of time, rock fragments will begin to fall away from the wall and ceiling surfaces of the newly excavated rocks. An additional problem is the passage of gas, such as methane, from the newly exposed rock surfaces. Further, any coating must be relatively impervious to moisture.

WO 99/48833 discloses a two-component gypsum plaster jointing compound including gypsum and a polymeric retarder in one component and a setting accelerator in a second component. Improvements in the stability of the two components without materially affecting the setting time of the admixture of the components are sought. It has now been found that a composition including two components one of which includes certain neutralizing agents.

In a first aspect of the present invention there is provided a composition comprising Component A and Component B; wherein Component A comprises: gypsum, an alkaline polymer (also referred to as "an alkaline first polymer"), an alkaline agent, and a hydration inhibitor, and wherein Component B comprises: a second polymer (also referred to as "an addition polymer"), a filler, and an activator.

In a second aspect of the present invention there is provided a method of forming a polymer-modified gypsum comprising forming Component A and Component B; wherein Component A comprises: gypsum, an alkaline first polymer, an alkaline agent, and a hydration inhibitor; and wherein Component B comprises: a second polymer, a filler, and an activator; and admixing Component A and Component B.

In a third aspect of the present invention there is provided a polymer-modified gypsum formed by the method of the second aspect of the present invention.

Component A of the composition of the present invention includes gypsum, an alkaline first polymer, an alkaline agent, and a hydration inhibitor.

The gypsum used in this invention can be selected from a wide variety of settable forms of calcium sulphate which include anhydrous calcium sulphate and/or chemical gypsum, commonly called synthetic gypsum, as well as calcium sulphate hemihydrate.

There are primarily two types of hemihydrate ($CaSO_4 \cdot 1/2H_2O$) which are commercially available and conventionally referred to as the alpha and beta forms. The alpha hemihydrate is conventionally prepared by placing lump gypsum into an autoclave and calcining it at controlled superatmospheric pressure in the presence of steam. In contrast, beta hemihydrate is prepared by heating the dihydrate at atmospheric pressure in either a kettle or rotary calciner. Although the physical appearances of these two types of gypsum can be the same, they differ in the water/gypsum ratio required to produce workable products. The dissimilarity in the physical nature of the gypsum particles of the two forms arises from the differences in their respective surface properties. The larger alpha crystals have low water absorption and smaller surface area per unit weight. This translates into a lower water requirement to cause setting up, or curing, of the gypsum. The lower the weight of water in proportion to the weight of dry gypsum solids, the greater the strength of the final product after curing. The amount of gypsum used in the formulation of Component A is typically from 50 to 80 wt %, based on the total weight of Component A. Preferably, 60–70 wt %, based on the total weight of Component A is used.

Component A includes an alkaline first polymer, i.e., a polymer which is provided at a pH of 7 or higher. The alkaline first polymers useful in this invention are typically addition polymers of ethylenically unsaturated monomers and include vinyl polymers and polymers of acrylates and methacrylates. Examples of polymerized monomers can include methyl acrylate, butyl acrylate, ethyl acrylate, methyl methacrylate, ethyl methacrylate, butyl methacrylate, hexyl methacrylate and lauryl methacrylate. Other monomers which can be used are styrene, vinyl acetate, vinyl versatate and vinyl chloride. Copolymers of two or more of these monomers can be employed as desired depending on the properties required in the final composition. The term "copolymer" as used herein is intended to include polymer blends as well as true copolymers. The polymer can be an emulsion polymer or it can be in the form of a water redispersible powder. Preferred are copolymers formed by emulsion polymerization, which can contain about 35 to 65% solids, by volume.

When selecting monomers or monomer blends for use in the alkaline first polymer of Component A of the composition, it is necessary to keep in mind the various properties imparted by each monomer. For example, polymerized styrene is alkali-resistant and water resistant, but its long term aging properties are not very good. For some applications, this negative feature can be an acceptable accommodation. Polymerized vinyl acetate has low water resistance but in certain applications, e.g., when the composition is applied to a subterranean surface which is substantially devoid of moisture, this can be acceptable. Acrylate and methacrylate polymers have good long term aging properties and good water and alkali resistance. The amount of polymer present in Component A is typically from 20–99 wt %, based on the total weight of Component A.

One of the properties which should be considered in the choice of a polymer is the "glass transition temperature" or "Tg" as measured by differential scanning calorimetry (DSC) using the mid-point in the heat versus temperature transition as the Tg value, using a heating rate for the DSC measurement of 20° C./minute. The preferred Tg for the alkaline first polymer is in the range of −20° C. to 50° C., with a more preferred range being from 0° C. to 40° C. An example of a suitable alkaline first copolymer is PRIMAL™ AC-339, which is an acrylic polymer having a Tg=26° C., available from the Rohm and Haas Co. of Philadelphia, Pa.

Component A includes an alkaline agent. The alkaline agent is selected from amines and alkaline earth bases. Suitable amines include ammonia, primary amines, secondary amines, and tertiary amines. Suitable alkaline earth bases include the hydroxide, carbonate, bicarbonate, and acetate salts of alkaline metals. Preferred are aminomethyl propanol and the hydroxides of calcium, magnesium, and barium. More preferred is calcium hydroxide. The alkaline agent is added in an amount sufficient to provide Component A at a pH of 7 or higher. Typically the alkaline agent is present at a level of 0.05 to 1 wt %, preferably 0.1 to 0.3 wt % based on the total weight of Component A.

Component A includes a hydration inhibitor to prevent the setting of the gypsum. The hydration inhibitor is typically a polymer or copolymer of a polycarboxylic acid. Examples include polymers and copolymers of acrylic acid, methacrylic acid, itaconic acid and fumaric acid. Copolymers of acrylic acid or methacrylic acid with an alkyl ester or amide of acrylic acid or methacrylic acid and polycarboxylic acid anhydrides are preferred hydration inhibitors. The polymeric hydration inhibitor can conveniently be in the form of the sodium or ammonium salt. A preferred hydration inhibitor includes, as polymerized units, from 50 to 99.9% acrylic acid and 0.1 to 50% acrylamide, by weight. More preferably, the hydration inhibitor includes 95 to 98% acrylic acid, by weight, and 2 to 5%, by weight, of acrylic acid. Most preferably, the hydration inhibitor is polyacrylic acid. An examples of a suitable hydration inhibitor is OROTAN™ 963, sold by the Rohm and Haas Co., Philadelphia, Pa. The hydration inhibitor is incorporated into Component A in an amount of from 0.1 to 2.0 wt %, based on the total weight of Component A.

Component B of the composition of the present invention includes a second polymer, a filler, and an activator. Component B includes a second polymer; second polymers useful in this invention are typically addition polymers of ethylenically unsaturated monomers and include vinyl polymers and polymers of acrylates and methacrylates. Examples of polymerized monomers can include methyl acrylate, butyl acrylate, ethyl acrylate, methyl methacrylate, ethyl methacrylate, butyl methacrylate, hexyl methacrylate and lauryl methacrylate. Other monomers which can be used are styrene, vinyl acetate, vinyl versatate and vinyl chloride. Copolymers of two or more of these monomers can be employed as desired depending on the properties required in the final composition. The term "copolymer" as used herein is intended to include polymer blends as well as true copolymers. The polymer can be an emulsion polymer or it can be in the form of a water redispersible powder. Preferred are copolymers formed by emulsion polymerization, which can contain about 35 to 65% solids, by volume.

The pH of the second polymer in Component B is not critical since it does not come into contact with the gypsum until the two components are blended with the intent of causing the gypsum to set up. The second polymer can be either acidic or alkaline. However, it is preferable to use an acidic polymer i.e., a polymer having a pH<7. Component B typically has pH<7.

When selecting monomers or monomer blends for use in the second polymer of Component B of the composition, similar guidelines to those included for the alkaline first polymer of Component A pertain. The amount of second polymer present in Component B is typically from 20–99 wt %, based on the total weight of Component B.

The preferred Tg for the second polymer is in the range of −20° to 50° C., with the most preferred range being from 0° to 40° C. An example of a suitable second copolymer is PRIMAL™ HA-16, which is an acidic acrylate/acrylamide polymer having a Tg=35° C., available from the Rohm and Haas Co. of Philadelphia, Pa.

Component B of the composition includes a filler. Examples of suitable fillers, also called extenders, are sand, mica, silica aluminate and fly ash. A low density fly ash is commercially available as "Hollowfill". The filler is typically present in an amount of 30–50%, preferably 35–45%, by wt based on the total weight of Component B.

An activator is included in Component B of the composition. The amount of activator required will be related to the amount of alpha gypsum and hydration inhibitor present in the composition. The activator will preferably be added in an amount of from 0.1 to 6.0 weight percent, and more preferably from 0.1 to 4.0 weight percent, based on the total weight of Component B. Suitable activators include metallic salts which can provide acidic cations. Preferable metallic salts are aluminum sulfate, calcium sulfate, ferric sulfate, zinc sulfate and ferric chloride. The most preferred activator for this composition is aluminum sulfate.

In the second aspect of the present invention there is provided a method of forming a polymer-modified gypsum comprising forming Component A and component B as described hereinabove; admixing Component A and Component B; and, optionally, applying the admixture to a substrate. Components A and B are preferably each fluid dispersions in an aqueous medium. By a "dispersion in an aqueous medium" is meant that the constituents of the Component are admixed with a medium which is a single continuous phase containing greater than 50% water, by wt based on the weight of the medium. It is contemplated that such constituents which are soluble or partially soluble in the aqueous medium will dissolve and the balance of the material will be dispersed in the aqueous medium. Components A and B are typically applied at a volume ratio of from 95:5, respectively, to 5:95. The optimum ratio can be determined by considering factors such as the surface to be treated, the time required for cure, equipment capability, and other processing concerns. Other ingredients can be added to the composition, many of them can be added to either Component A or Component B or to the admixture, in order to aid processing, handling or formulating. Ingredients which are traditionally utilized in coatings include antifoamers, surfactants, rheology modifiers, set control agents, coalescents, natural and synthetic fibers, and expansion agents.

When the admixture is used to form a thick section, it can be discharge into a mold or the like.

When the admixture is applied to a substrate in the form of a coating it is typically from 0.1 to 10 mm thick, preferably from 0.5 to 5 mm and most preferably from 1 to 2 mm. Application is most conveniently done by use of pressurized spray applicators. Component A and Component B can be fed via separate hose or duct systems to either a single or dual applicator nozzles, where both are sprayed either simultaneously, as through dual nozzles, or as a blend, via a single nozzle, onto the substrate.

A coating formed by the application of the present composition provides resistance to the passage of gases, such as methane, which might leach out from newly exposed rock in a mining tunnel application. Further, it provides a coating which is substantially impervious to moisture. The present composition readily adheres to various substrates, especially newly excavated subterranean rock, which helps to reinforce the exposed facing of these rocks so as to prevent fragments from "calving" off and falling onto either mining personnel or their equipment. A coating thickness in the range of 1 to 2 mm can set up in less than 3 minutes.

In the third aspect of the present invention there is provided a polymer-modified gypsum formed by the method of the second aspect of the present invention.

The following examples are presented to Illustrate the invention and the results obtained by the test procedures.

EXAMPLE 1

Preparation of a Composition of the Invention (Component A and Component B)

| Ingredient | parts by weight |
|---|---|
| Component A | |
| Alkaline first polymer (PRIMAL ™ AC-339) | 27.68 |
| Antifoam (Wacker S-882) | 0.29 |
| Surfactant (TRITON ™ X-405) (1:1 in water) | 1.03 |

-continued

| Ingredient | parts by weight |
|---|---|
| Alkaline agent (AMP-90) | 0.10 |
| Hydration inhibitor (OROTAN ™ 963 | 0.40 |
| Coalescent (Butyl CARBITOL ™) (2:1 in water) | 1.18 |
| Gypsum (Crystalcal; alpha hemi-hydrate) | 69.23 |
| Pigment (M1 Black Pigment; GK 5493) | 0.03 |
| Rheology modifier (ACRYSOL ™ RM-1020) (1:1 in water) | 0.06 |
| Component B | |
| Second (acidic) polymer (PRIMAL ™ HA-16) | 31.90 |
| Defoamer (Wacker S-882) | 0.24 |
| Surfactant (TRITON ™ X-405) (1:1 in water) | 0.99 |
| Water | 1.39 |
| Activator (Al2SO4.18 H20 (1:1 in water) | 1.19 |
| Filler (ATH Nyala M20-G | 64.09 |
| Rheology modifier (ACRYSOL ™ SCT-275) (1:1 in water) | 0.20 |

EXAMPLE 2

Effecting the Method of the Invention

Component A and Component B of Example 1 were admixed in a 1:1 ration, by volume (weight ratio of A/B=52.7/47.3). The admixture had a solids content of 81.7%, by weight, calculated density of 1.74, pH=6, healing time<5 min; set time<10 min.

EXAMPLE 3

Effect of Alkaline Agent Type and Amount

Compositions according to Example 1 with various alkaline agent type and amounts were prepared and admixed to provide the results of Table 3.1

TABLE 3.1

Effect of alkaline agent type and amount

| | Sample No. | | | | | | |
|---|---|---|---|---|---|---|---|
| | 3-1 | 3-2 | 3-3 | 3-4 | 3-5 | 3-6 | 3-7 |
| Alkaline agent | None | AMP 90 | NaOH (50%) | NaSi (50%) | Ca(OH)2 | Ca(OH)2 | Ca(OH)2 |
| Wt % on total comp. | 0 | 0.13 | 0.05 | 0.13 | 0.07 | 0.12 | 0.16 |
| PH | 7.1 | 8.4 | 8.4 | 8.3 | 8.4 | NA | 9.8 |
| Viscosity (KU) | 112 | 113 | 114 | 125 | 118 | NA | 120 |
| Set time Composition + 3% set gypsum (I) | 16 | 20 | 18 | 19 | 19 | NA | 50 |
| PH | 7.1 | 8.4 | 8.4 | 8.2 | 8.4 | 9.4 | 9.6 |
| Viscosity (KU) | 118 | 120 | 122 | 133 | 122 | 124 | 123 |
| Gel Strength Composition + 3% set gypsum (II) | 40 | 40 | 50 | 70 | 60 | 50 | 60 |
| Viscosity (KU) | >140 | >140 | >140 | >>140 | >140 | >140 | >140 |
| Gel Strength | 370 | 270 | >440 | >440 | 100 | 85 | 70 |

Notes:
Viscosity in Krebs units (KU). Set time measured with needle (Vicat, using Prolabo apparatus ASTM No. 23.6 according to ASTM C-191 with a 1 mm needle, reported in min.).
Composition + 3% set gypsum (I) = Initial composition + 3 wt % previously set gypsum.

Composition+3% set gypsum (II)=Initial composition+3 wt % previously set gypsum after 10 days of low/high temperature cycles (10 cycles, each cycle including a high and a low temperature interval; low temperature=5° C.; high temperature=40° C.; time to change temperature=30 min; time held at each temperature=12 hours. Gel strength via Gel Strength Tester from Sheen Instruments, Ltd. Using the 4×2 cm paddle on a 300 cc minimum volume sample, reported in g-cm. AMP-90=2-aminomethyl propanol Admixtures of the invention, samples 3–2, 3–5, 3–6, and 3–7 exhibit a useful balance of set time, and gel strength stability as measured in the stress test, Composition+3% set gypsum (II), relative to the admixtures of comparative samples 3–1, 3–3, and 3–4.

EXAMPLE 4

Effect of Amine Alkaline Agent Type and Amount

Compositions according to Example 1 with various amounts of AMP 90 were prepared and admixed to provide the results of Table 4.1

TABLE 4.1

Effect of alkaline agent type and amount

| | Sample No. | | | | | | | |
|---|---|---|---|---|---|---|---|---|
| | 4-1 | 4-2 | 4-3 | 4-4 | 4-5 | 4-6 | 4-7 | 4-8 |
| Wt % AMP 90 on total comp. wt | 0 | 0.03 | 0.06 | 0.1 | 0.13 | 0.17 | 0.2 | 0.3 |
| PH | 7.1 | 7.5 | 7.8 | 8.1 | 8.4 | 8.6 | 8.8 | 9.4 |
| Viscosity (KU) | 112 | 113 | 112 | 112 | 112 | 111 | 112 | 110 |
| Set time | 16 | 17 | 17 | 17 | 18.5 | 19.5 | 23 | 40 |
| Composition + 3% set gypsum (I) | | | | | | | | |
| PH | 7.1 | 7.5 | 7.8 | 8.0 | 8.4 | 8.5 | 8.8 | 9.4 |
| Viscosity (KU) | 118 | 119 | 118 | 119 | 119 | 117 | 118 | 115 |
| Gel Strength | 40 | 40 | 45 | 40 | 40 | 40 | 35 | 35 |
| Composition + 3% set gypsum (II) | | | | | | | | |
| pH | 7.1 | 7.4 | 7.8 | 8.0 | 8.2 | 8.4 | 8.7 | 9.2 |
| Viscosity (KU) | >140 | >140 | >140 | >140 | >140 | >140 | >140 | 113 |
| Gel Strength | 370 | 400 | 330 | 340 | 270 | 240 | 130 | 100 |

Notes as in Table 3.1

Admixtures of the invention, samples 4–3, 4–4, 4–5, 4–6, 4–7 and 4–8 exhibit a useful balance of set time, and gel strength stability as measured in the stress test, Composition+3% set gypsum (II), relative to the admixtures of comparative samples 4–1 and 4–2.

We claim:

1. A composition comprising Component A and Component B;
   wherein Component A comprises: gypsum, an alkaline polymer, an alkaline agent selected from the group consisting of ammonia, primary amines, secondary amines, tertiary amines, hydroxide, carbonate, bicarbonate, and acetate salts of alkaline metals, and a hydration inhibitor selected from the group consisting of polymers and copolymers of acrylic acid, methacrylic acid, itaconic acid and fumaric acid;
   wherein Component B comprises: an addition polymer, a filler, and an activators, the alkaline polymer, hydration inhibitor, and addition polymer differing from one another; and
   wherein both Components A and B are dispersed in an aqueous medium.

2. The composition of claim 1 wherein the volume ratio of Component A to Component B is from 95:5 to 5:95.

3. The composition of claim 1 wherein Component A comprises: 20–50 wt% alkaline first polymer, 50–80 wt% gypsum, 0.05–1.0 wt% alkaline agent, and 0.1–2.0 wt% hydration inhibitor, based on the total weight of Component A.

4. The composition of claim 1 wherein Component B comprises: 20–70 wt% second polymer; 30–50 wt% filler and 0.1–6.0 wt% activator, based on the total weight of Component B.

5. A method of forming a polymer-modified gypsum comprising forming Component A and Component B; wherein Component A comprises: gypsum, an alkaline polymer, an alkaline agent selected from ammonia, primary amines, secondary amines, tertiary amines, hydroxide, carbonate, bicarbonate, and acetate salts of alkaline metals, and a hydration inhibitor selected from polymers and copolymers of acrylic acid, rnethacrylic acid, itaconic acid and fumaric acid; wherein Component B comprises: an addition polymer, a filler, and an activator, the alkaline polymer, hydration inhibitor, and addition polymer differing from one another; and wherein both Components A and B are dispersed in an aqueous medium; and
   admixing Component A and Component B.

6. The method of claim 5 further comprising applying said admixture to a substrate.

7. The method of claim 6 wherein the substrate is the excavated rock surface of a subterranean mine.

8. A polymer-modified gypsum formed by the method of claim 5.

* * * * *